United States Patent
Ihattula (10) Patent No.: US 8,060,088 B2
(45) Date of Patent: Nov. 15, 2011

(54) METHOD, NETWORK ELEMENT AND COMMUNICATION SYSTEM FOR OPTIMIZED SELECTION OF AN AGENT ENTITY AS WELL AS MODULES OF THE NETWORK ELEMENT

(75) Inventor: Jari Ihattula, Santa Clara, CA (US)

(73) Assignee: Nokia Corporation, Espoo (FI)

( * ) Notice: Subject to any disclaimer, the term of this patent is extended or adjusted under 35 U.S.C. 154(b) by 460 days.

(21) Appl. No.: 11/593,482

(22) Filed: Nov. 7, 2006

(65) Prior Publication Data

US 2008/0108349 A1 May 8, 2008

(51) Int. Cl.
*H04W 4/00* (2009.01)
(52) U.S. Cl. .......... 455/435.1; 370/331; 726/4; 713/168
(58) Field of Classification Search .................. 370/338, 370/331; 709/225, 220, 221, 222, 229; 455/435.1; 726/4; 713/168
See application file for complete search history.

(56) References Cited

U.S. PATENT DOCUMENTS

2004/0202126 A1* 10/2004 Leung et al. ................. 370/331
2005/0041808 A1* 2/2005 He ................................ 380/248
2005/0157673 A1* 7/2005 Verma et al. ................. 370/328

FOREIGN PATENT DOCUMENTS

WO  WO 2004/004281 A1  1/2004

OTHER PUBLICATIONS

Kulkarni, M. et al., "Mobile IPv4 Dynamic Home Agent (HA) Assignment", RFC 4433, Standards Track, Cisco Systems Inc., pp. 1-24, Mar. 2006.
International Search Report PCT/EP2007/061294.

* cited by examiner

*Primary Examiner* — Charles Appiah
*Assistant Examiner* — Alexander Yi
(74) *Attorney, Agent, or Firm* — Harrington & Smith (57) ABSTRACT

A method for selecting an agent entity for a terminal in a communication system, including allocating an address to a terminal, the terminal being configured to access a communication network using a selected access technology out of at least one access technology common to the terminal and the communication network, sending a registration request from the terminal to a default agent entity, redirecting, by a redirector, the registration request from the terminal to an intercepting agent entity based on identifying that the registration request is directed to the default agent entity, intercepting, by the intercepting agent entity, the redirected registration request from the terminal, responding, by the intercepting agent entity, with a registration request response to the terminal, and registering, based on the response from the intercepting agent entity, the terminal at the predetermined agent entity of the plurality of agent entities of the communication network.

29 Claims, 6 Drawing Sheets

Registration Request

| ... | x.x.x.dAE | NAI | s.adr. |

Fig. 4B

Registration Request response

| ... | x.x.x.AE$_0$ | NAI | s.adr. | x.x.x.dAE | ... |

Fig. 5

METHOD, NETWORK ELEMENT AND COMMUNICATION SYSTEM FOR OPTIMIZED SELECTION OF AN AGENT ENTITY AS WELL AS MODULES OF THE NETWORK ELEMENT

FIELD OF THE INVENTION

The present invention relates to a method, network element and communication system, as well as modules of the network element, for optimized selection of a mobile agent entity for at least one client terminal connecting to a network element in a communication system.

BACKGROUND OF THE INVENTION

Communication technology has made considerable progress in recent years. According to one aspect of such progress, communication networks providing access to different services by means of different technologies such as GSM (Global System for Mobile Communications), UMTS (Universal Mobile Telecommunications System), BlueTooth©, WCDMA (Wideband Code Division Multiple Access) and WLAN (Wireless Local Area Network) were developed.

Most recently, communication networks and terminals which are enabled for access to a network enabling access by one out of plural of such technologies are being developed. Such networks and/or terminals are referred to as multi-access networks/terminals. Those multi-access networks allow access to data services via multiple technologies such as GSM, GPRS (General Packet Radio Service), WCDMA, UMTS and the like. These technologies may require the establishment of a PDP (Packet Data Protocol) context between the terminal and the network. Further technologies providing access to data services include technologies such as WLAN, WiMAX (Worldwide Interoperability for Microwave Access), xDSL (Digital Subscriber Line), xPON (Passive Optical Network) and cable modem. These technologies may be used in conjunction with IPsec (IP (Internet Protocol) Security) tunneling in order to provide encrypting and/or authentication functionalities and the like. All these different technologies may require a different kind of access termination functionality, which can be implemented in one or many network elements.

The applicable technologies are, however, not limited to those relying on a PDP context (e.g. GPRS) or IP/IPsec tunneling (e.g. WLAN), but may be based also on other principles.

Functionalities like charging and ensuring Quality of Service (QoS) can quite often be access technology dependent. When seamless service continuity is implemented by adding a mobility layer on top of the access termination layer, there will arise a requirement of conveying the access specific information between the mobility and access termination layer.

For the purpose of the present invention to be described herein below, it should be noted that an access technology may be any of the above-described technologies by means of which a terminal can access a communication network. Although in the following only GPRS based on the PDP context and WLAN via IP/IPsec are used as exemplary access technologies for descriptive purposes, other present or future technologies, such as the technologies described above or BlueTooth©, Infrared, and the like may be used; although the above technologies are mostly wireless access technologies, e.g. in different radio spectra, access technology in the sense of the present invention may also imply wirebound technologies;

a network element may for example be any device, unit or means by means of which a user may have access to a communication network, or which enables a user to experience services provided by the communication network;

a terminal in turn may for example be any device, unit or means by means of which a user accesses a communication network, i.e. at least one network element thereof; this implies that a terminal as referred to in the present specification may correspond to a mobile as well as a non-mobile device, independent of the technology platform on which the terminal is based; the terminal can be capable of performing multi-access, i.e. can establish a connection to any network element as long as at least one commonly used access technology (e.g. GPRS or WLAN) can be agreed on;

generally, the present invention is advantageously applicable in those network/terminal environments relying on a packet based transmission scheme according to which data are transmitted in packets and which are for example based on the Internet Protocol IP, e.g. mobile IP. In a particular example of the present invention, mobile IPv4 (MIPv4, mobile IP version 4) is applied. The present invention is, however, not limited thereto, and MIPv6 or any other IP version, or, more generally, a mobility protocol following similar principles as MIPv4, is also applicable.

a gateway entity as a network element or at least as a part of a network element may be any device, unit or means by which the terminal can connect to or communicate with the network or network element (while taking into account the at least one commonly used access technology);

an agent entity may be any device, unit or means which registers a terminal to a communication network;

a home agent (abbreviated as "HA" hereinafter) entity may be any device, unit or means which serves as an entry point for the terminal into a network; as a particular example, the home agent entity may be a MIPv4 Home Agent.

method steps likely to be implemented as software code portions and being run using a processor at the network element, are software code independent and can be specified using any known or future developed programming language as long as the functionality defined by the method steps is preserved;

generally, any method step is suitable to be implemented as software or by hardware without changing the idea of the present invention in terms of the functionality implemented;

method steps and/or devices, units or means likely to be implemented as hardware components at a terminal or network element or module thereof are hardware independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components;

devices, units or means (terminals, network elements or modules thereof) can be implemented as individual devices, units or means, but this does not exclude that they are implemented in a distributed fashion throughout the system, as long as the functionality of the device, unit or means is preserved.

RFC (request for comments) 4433 describes a method of dynamically selecting a home agent entity by sending the initial registration request to a default home agent entity (HA)

called "Requested HA". While these comments do not address how the actual and finally selected home agent entity should be selected, there is disclosed an example how that could be achieved e.g. by using an external AAA ("Authentication, Authorization and Accounting") infrastructure. The external AAA infrastructure may cooperate with a server entity providing at least one service to the network and/or the terminal.

Figure 1:
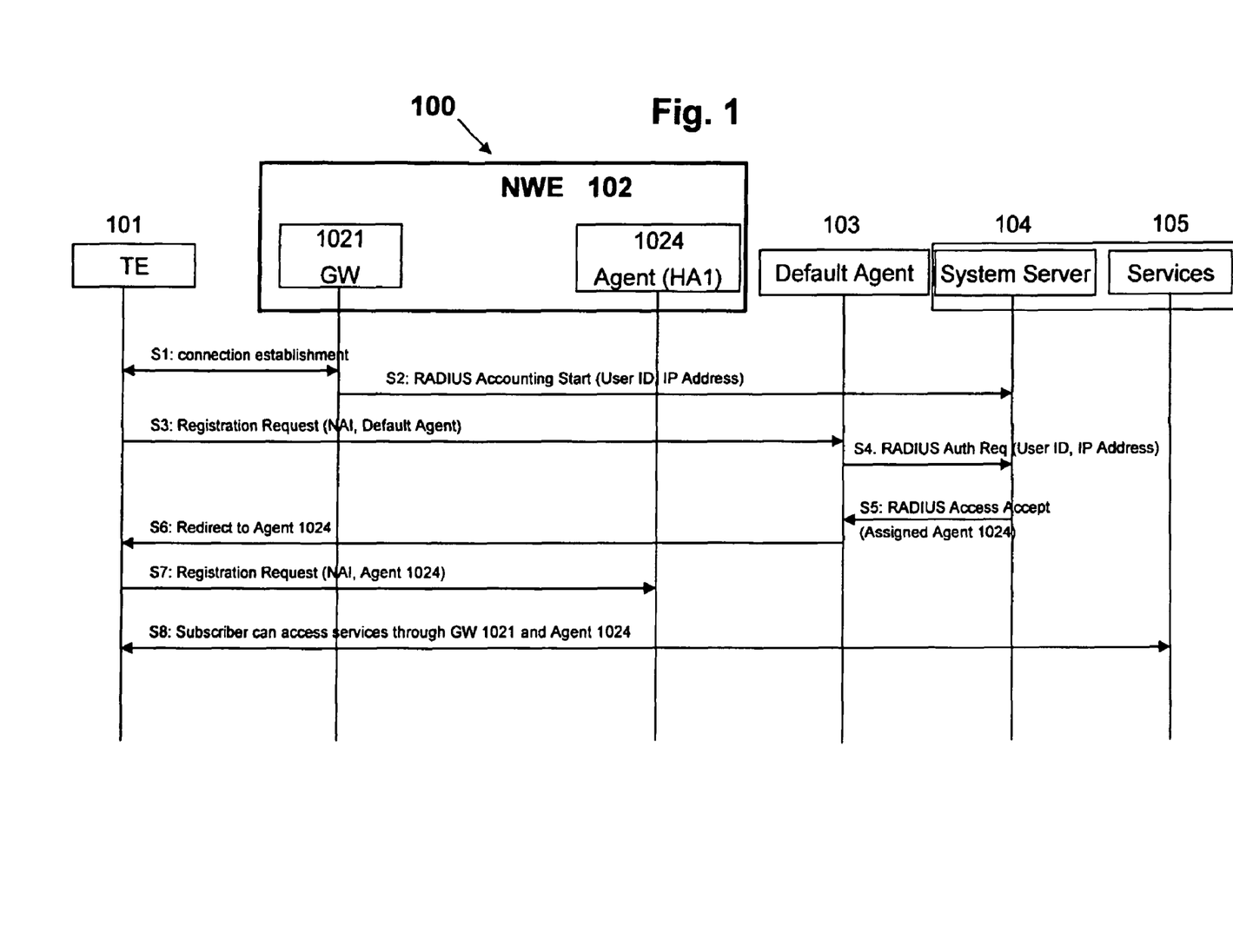
FIG. 1 shows messaging involved in registering a terminal at a communication network.

FIG. 1 shows a communication system 100 and such messaging involved in registering a terminal 101 at a communication network 102-105, 1021, 1024. Signalling between elements is indicated in horizontal direction, while time aspects between signalling are reflected in the vertical arrangement of the signalling sequence as well as in the sequence numbers.

As shown in FIG. 1, in the communication system 100, the terminal 101 sends a connection-establishment request to a gateway entity GW 1021 of a network element NWE 102 in step S1 so that a connection is established. Generally, connection establishment, among others, involves assigning an address to the terminal which may also be accomplished in other ways than establishing a connection.

In step S2, the gateway entity GW 1021 sends a RADIUS accounting start containing the user ID and user IP address to an external AAA server or system server 104, respectively. Thus, the system server 104 has received, in the message, information about the access termination and can therefore determine the location of the home agent ("HA" hereinafter) entity 1024 considered to be optimum.

In step S3, an initial registration request is sent from the terminal 101 to the external default HA 103.

The external default HA 103 inquires an address of the home agent entity 1024 for the terminal 101 from the system server 104 in step S4, and obtains the address of the home agent entity 1024 from the system server 104 in step S5.

In other words, because the goal can be considered to select HA1 1024 located in the same node or network element NWE 102, respectively, as the access termination and since the external default HA 103 does not know where the access is terminated, it has to ask that information from the system server 104. The system server 104 can then return this information to the default HA 103 in step S5 and the default HA 103 will then use this information to redirect the mobile IP session to HA1 1024, which is considered to be a possible optimum HA.

Namely, the default HA 103 sends in step S6 a redirect message to the terminal 101 containing an address of HA1 1024 considered to be optimum, which is in most cases the agent entity in the same network element NWE 102 in which the terminal 101 is access-terminated.

Based on the home agent entity address received from the default HA 103, the terminal 101 sends a further registration request to the home agent entity 1024 in step S7.

In step S8, having learned the home agent entity 1024 considered to be optimum, the terminal 101 may now access services 105 in the system server 104 via the gateway entity GW 1021 and the home agent entity 1024.

As derivable from FIG. 1 to be explained herein below in more detail, in the above solution, considerable signalling is required for selecting the HA by referring to the system default HA 103 and the system server 104, and for redirection to the HA 1024 in the access-terminating network element NWE 102. However, in many cases the HA to be selected is the agent entity in the same network element NWE 102 in which the terminal is access-terminated. Furthermore, two independent signalling messages (messages sent in steps S2, S4) are sent to the system server 104.

Therefore, the above solution has one or more of the following drawbacks:

It is slow:

The above signalling is performed irrespective of the fact whether or not the HA to be selected is situated in the access-terminating network element.

It pertains the danger of synchronisation problems:

The above two independent signalling messages may arrive in improper order at the system server.

Processing load is put on the system server:

All signalling is directed to the system server irrespective of fact that in many cases inquiring the correct HA from the server is not required.

SUMMARY

In consideration of the above, it is an object of the present invention to provide a method, a network element as well as modules thereof and a communication system for optimized selection of a home agent entity, e.g. a mobile IP Home Agent entity, for at least one terminal connecting to a network element in a mobile communication system.

According to the present invention, in a first aspect, this object is for example achieved by a method comprising:

allocating an address to a terminal, the terminal being configured to access a communication network using a selected access technology out of at least one access technology common to the terminal and the communication network;

sending a registration request from the terminal to a default agent entity;

redirecting, by a redirector, the registration request from the terminal to an intercepting agent entity based on identifying that the registration request is directed to the default agent entity;

intercepting, by the intercepting agent entity, the redirected registration request from the terminal;

responding, by the intercepting agent entity, with a registration request response to the terminal; and registering, based on the response from the intercepting agent entity, the terminal at the predetermined agent entity of the plurality of agent entities of the communication network.

According to advantageous further refinements of the invention as defined under the above first aspect, the registration request of the terminal comprises at least a default agent entity address, a terminal identifier and the address of the terminal;

the redirecting comprises policy based routing configured to route the registration request having the default agent entity address to the intercepting agent;

the intercepting comprises receiving the routed registration request;

the responding comprises composing a registration request response comprising at least an address of the predetermined agent entity, the terminal identifier, the default agent entity address and the address of the terminal;

the registering is based on the address of the predetermined agent entity;

the access is based on one of an access via a Packet Data Protocol context and an Internet Protocol access;

the allocating of the terminal address is performed in response to a connection-establishing request;

the Packet Data Protocol context is for General Packet Radio Service access;

the Internet Protocol access is an Internet Protocol security tunnel for one of a Wireless Local Access Network, Worldwide Interoperability for Microwave Access, Digital Subscriber Line, Passive Optical Network and cable modem access.

According to the present invention, in a second aspect, this object is for example achieved by a network element comprising:

a gateway entity configured to execute at least one access technology, to send, to a terminal, an address allocated to the terminal, the terminal being configured to access a communication network using a selected access technology out of at least one access technology common to the terminal and the communication network, and to relay a registration request from the terminal to a default agent entity;

a redirector configured to redirect the registration request from the terminal to an intercepting agent entity based on identifying that the registration request is directed to the default agent entity;

an intercepting agent entity configured to intercept the redirected registration request from the terminal and to respond to the terminal with a registration request response; and an agent entity configured to register the terminal based on the response from the intercepting agent entity.

According to advantageous further refinements of the invention as defined under the above second aspect, the registration request of the terminal comprises at least a default agent entity address, a terminal identifier and the address of the terminal;

the redirector is configured to perform policy based routing to route the registration request having the default agent entity address to the intercepting agent;

the intercepting agent entity is configured to receive the routed registration request;

the intercepting agent entity is configured to respond by composing the registration request response comprising at least an address of the predetermined agent entity, the terminal identifier, the default agent entity address and the address of the terminal;

the agent entity is configured to register the terminal based on the address of the predetermined agent entity;

the access is based on one of an access via a Packet Data Protocol context and an Internet Protocol access;

the gateway entity is configured to relay the allocated terminal address in response to a connection-establishing request;

the Packet Data Protocol context is for General Packet Radio Service access;

the Internet Protocol access is an Internet Protocol security tunnel for one of a Wireless Local Area Network, Worldwide Interoperability for Microwave Access, Digital Subscriber Line, Passive Optical Network and cable modem access.

According to the present invention, in a third aspect, this object is for example achieved by a communication system comprising:

a terminal configured to access a communication network using a selected access technology out of at least one access technology common to the terminal and the communication network, wherein an address is allocated to the terminal, a plurality of agent entities; and a network element comprising a gateway entity configured to execute the at least one access technology, to send, to the terminal, the address allocated to the terminal, and to relay a registration request from the terminal to a default agent entity, a redirector configured to redirect the registration request from the terminal to the intercepting agent entity based on identifying that the registration request is directed to the default agent entity, an intercepting agent entity configured to intercept the redirected registration request from the terminal and to respond to the terminal with a registration request response, and an agent entity configured to register the terminal based on the response from the intercepting agent entity.

According to the present invention, in a fourth aspect in combination with a fifth aspect as set out herein below, this object is for example achieved by a module for a network element in a communication system, comprising:

a receiver configured to receive a registration request comprising at least a source address, a terminal identifier and a system-default destination address;

a memory configured to hold at least one source-destination relation of the system-default destination address to a desired predetermined destination address;

a processor configured to monitor the registration request to detect the system-default destination address; and a transmitter configured to send the registration request to the desired predetermined destination address in case the system-default destination address is detected.

According to advantageous further refinements of the invention as defined under the above fourth aspect, the module is chipset insertable.

According to the present invention, in a fifth aspect in combination with the above forth aspect, this object is for example achieved by a module for a network element in a communication system, comprising:

a receiver configured to receive a registration request comprising at least a source address, a terminal identifier and a system-default destination address;

a memory configured to hold at least one desired predetermined registration address;

a processor configured to monitor the registration request to detect the system-default destination address, to not relay the registration request, in case the system-default destination address is detected, and to compose a registration request response comprising at least the source address of the registration request as a destination address, the system-default destination address, the terminal identifier and the desired predetermined registration address; and a responder configured to send the composed registration request response to the source address of the registration request.

According to advantageous further refinements of the invention as defined under the above fifth aspect, the module is chipset insertable.

According to the present invention, in a sixth aspect, this object is for example achieved by a network element comprising:

means for executing the at least one access technology;

means for sending, to a terminal, an address allocated to the terminal, the terminal configured to access a communication network using a selected access technology out of at least one access technology common to the terminal and the communication network, and for relaying a registration request from the terminal to a default agent entity;

means for redirecting the registration request from the terminal to the intercepting agent entity based on identifying that the registration request is directed to the default agent entity;

means for intercepting the redirected registration request from the terminal and for responding to the terminal with a registration request response; and means for registering the terminal based on the response from the intercepting agent entity.

According to the present invention, in a seventh aspect, this object is for example achieved by, a communication system, comprising:

means for accessing a communication network using a selected access technology out of at least one access technology common to a terminal and the communication network, wherein an address is allocated to the terminal, a plurality of agent entities; and a network element comprising means for executing the at least one access technology, means for sending, to the terminal, the address allocated to the terminal, and for relaying a registration request from the terminal to a default agent entity, means for redirecting the registration request from the terminal to the intercepting agent entity based on identifying that the registration request is directed to the default agent entity, means for intercepting the redirected registration request from the terminal and for responding to the terminal with a registration request response, and means for registering the terminal based on the response from the intercepting agent entity.

According to the present invention, in a eighth aspect, this object is for example achieved by a module for a network element in a communication system, comprising:

means for receiving a registration request comprising at least a source address, a terminal identifier and a system-default destination address;

means for holding at least one source-destination relation of the system-default destination address to a desired predetermined destination address;

means for monitoring the registration request to detect the system-default destination address; and means for sending the registration request to the desired predetermined destination address in case the system-default destination address is detected.

According to the present invention, in a ninth aspect, this object is for example achieved by a module for a network element in a communication system, comprising:

means for receiving a registration request comprising at least a source address, a terminal identifier and a system-default destination address;

means for holding at least one desired predetermined registration address;

means for monitoring the registration request to detect the system-default destination address, for not relaying the registration request, in case the system-default destination address is detected, and for composing a registration request response comprising at least the source address of the registration request as a destination address, the system-default destination address, the terminal identifier and the desired predetermined registration address; and means for sending the composed registration request response to the source address of the registration request.

Additionally, according to the present invention, there is presented a computer program embodied on a computer-readable medium, configured to control a method for selecting an agent entity for a terminal in a communication system, the method comprising:

allocating an address to a terminal, the terminal being configured to access a communication network using a selected access technology out of at least one access technology common to the terminal and the communication network, sending a registration request from the terminal to a default agent entity, redirecting, by a redirector, the registration request from the terminal to an intercepting agent entity based on identifying that the registration request is directed to the default agent entity, intercepting, by the intercepting agent entity, the redirected registration request from the terminal, responding, by the intercepting agent entity, with a registration request response to the terminal, and registering, based on the response from the intercepting agent entity, the terminal at the predetermined agent entity of the plurality of agent entities of the communication network.

In particular, the computer program product is directly loadable into an internal memory of the network element.

This invention thus proposes an optimized method to select the most suitable home agent entity, e.g. an integrated home agent entity.

In this connection, it has to be pointed out that advantageously the present invention enables:

provision of faster initial agent entity selection in case the HA turns out to be selected from the same network element where the access is terminated;

removal of the potential synchronization problems in view of the two independent signalling messages directed to the system server of the network as shown in FIG. 1;

putting less or at least no additional load on the system server.

BRIEF DESCRIPTION OF THE DRAWINGS

The present invention is described herein below with reference to the accompanying drawings, in which.

BEST MODE FOR CARRYING OUT THE INVENTION

The present invention is described herein below by way of example with reference to the accompanying drawings.

Figure 2:
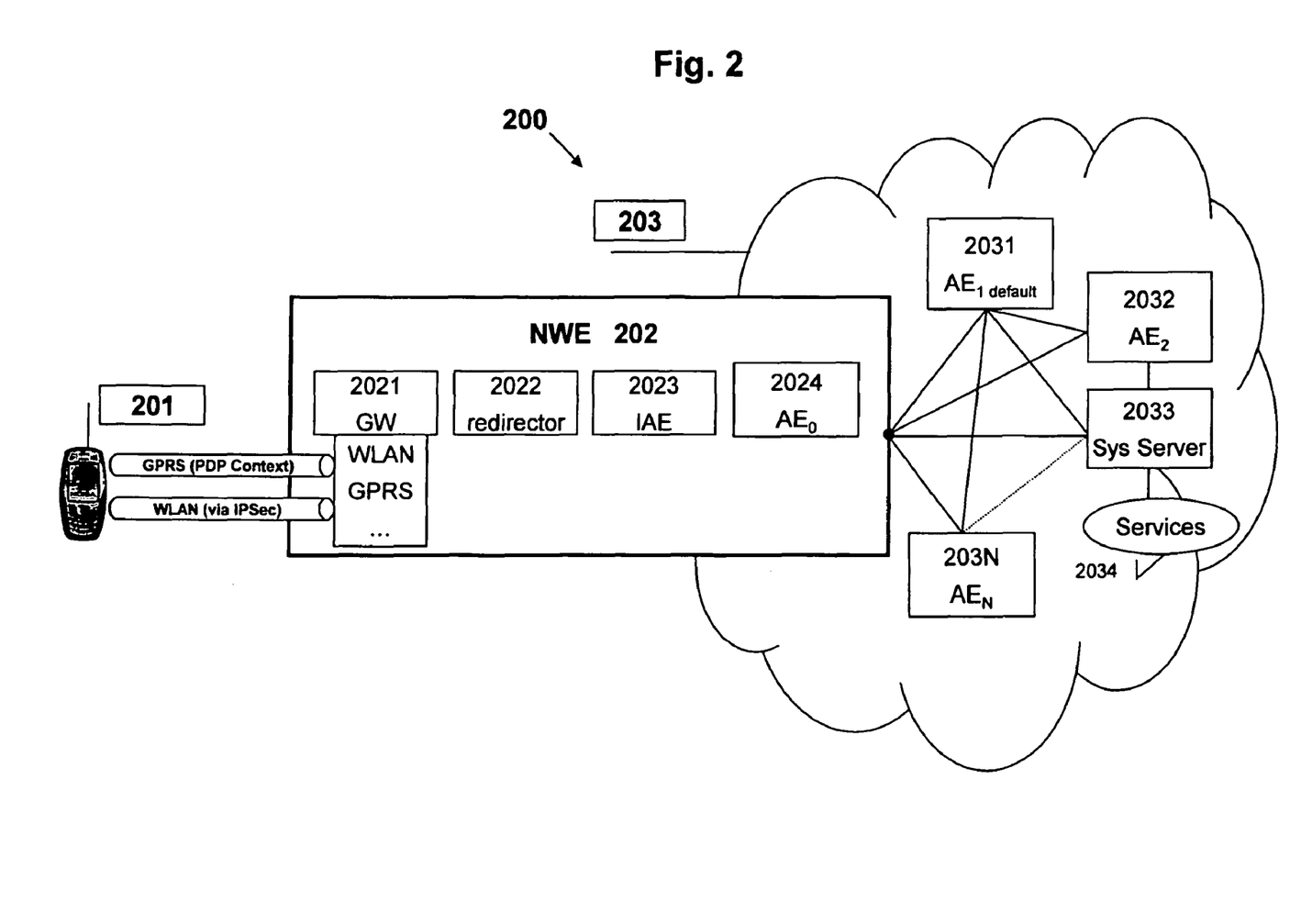
FIG. 2 shows a communication system according to the present invention.

FIG. 2 shows a communication system according to one example of the present invention.

Within FIG. 2, similar to the above-described (see FIG. 1) a communication system 200 comprises a terminal 201 and a communication network 202, 203. In the example of FIG. 2, the terminal 201 may contact the communication network with a common access technology, such as GPRS by using a PDP context and/or WLAN via IPsec etc., via a gateway entity GW 2021 sharing at least one of those access technologies. It is to be noted that both the terminal 201 and the gateway entity GW 2021 may be adapted to GPRS and/or to WLAN as well as to any other suitable above-described common access technology/technologies.

The communication network 202, 203 in this example comprises a network element NWE 202 comprising the gateway entity GW 2021 configured to at least one access technology, a redirector 2022, an intercepting agent entity IAE 2023 and a home agent entity $AE_0$ 2024. The intercepting agent entity IAE 2023 comprises or has access to information stating that the home agent entity 2024 is the optimum home agent entity for connections being access-terminated at the network element NWE 202.

Furthermore, the communication network 202, 203 comprises a plurality of agent entities $AE_1$ 2031, $AE_2$ 2032, $AE_N$ 203N, of which the agent entity 2031 $AE_1$ is set to be the default home agent entity for the communication system 200, and a system server 2033 providing services 2034 for the system.

Figure 3:
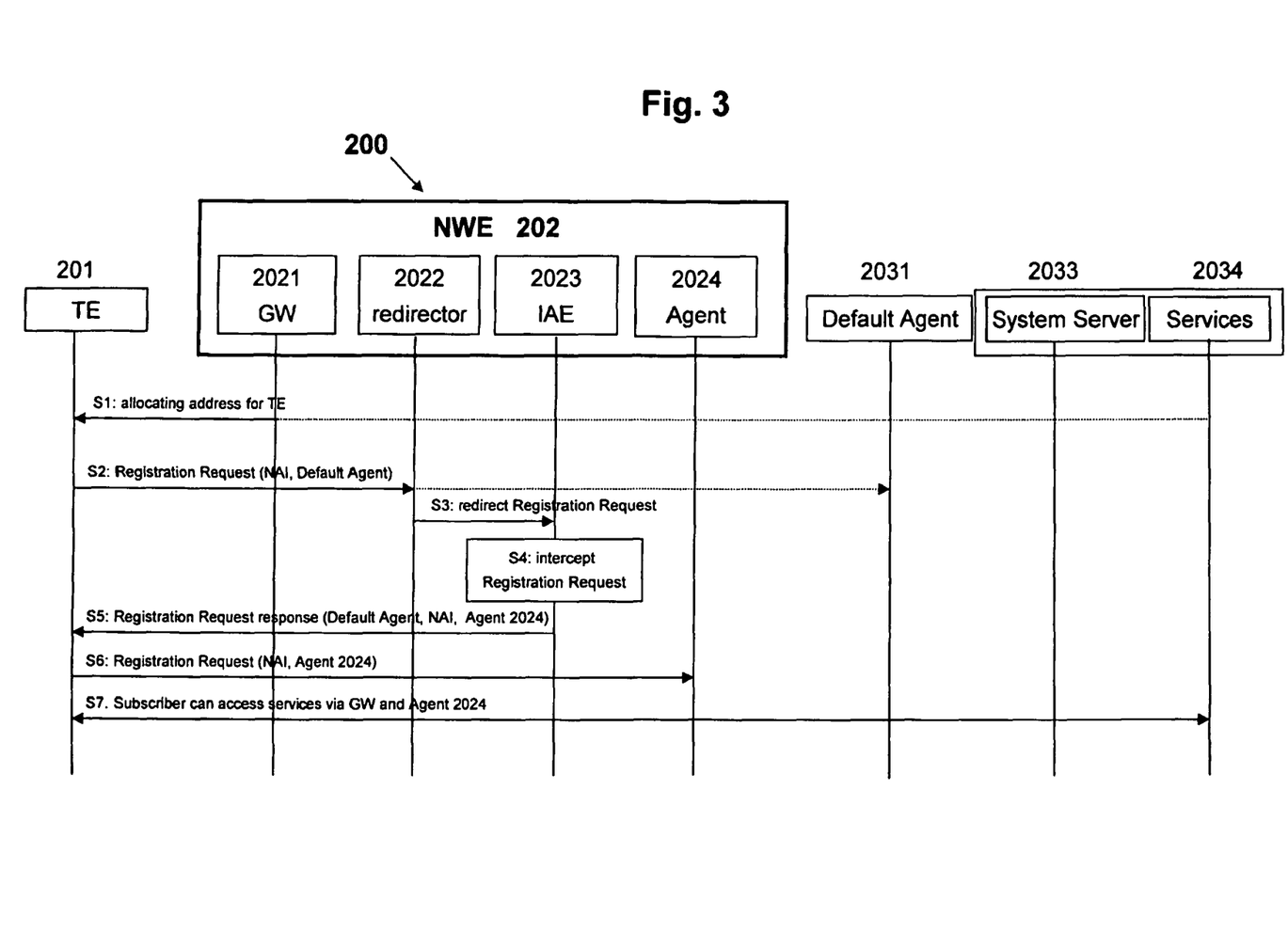
FIG. 3 shows messaging according to the present invention involved in registering a terminal at a communication network.

FIG. 3 shows messaging according to the present invention involved in registering a terminal at the communication system.

As shown above in FIG. 2, like reference signs of FIG. 3 denote like system components. Like in FIG. 1, signalling between elements is indicated in horizontal direction, while time aspects between signalling are reflected in the vertical arrangement of the signalling sequence as well as in the sequence numbers.

In a first step S1, an address is allocated to the terminal 201 from the communication network 202, 2031, 2033 e.g. in response to an activation of the terminal 201. Alternatively, the address may be allocated as a part of a connection established due to a connection establishing request as shown in FIG. 1, step S1.

Further, in step S2, a registration request that comprises the terminal address, the terminal identifier and the address of the system-default home agent entity is sent from the terminal 201 having the default home agent entity 2031 as a destination. In case of the terminal being compliant to 3GPP ($3^{rd}$ Generation Partnership Project) as an example, e.g. UMTS, the terminal identifier may be a Network Access Identifier (NAI) as defined in the 3GPP standards.

In step S3, the redirector 2022, receiving such a registration request from the terminal 201 and monitoring the messages through the network element NWE 202, routes any messages having the default agent entity 2031 as a destination to the intercepting agent entity IAE 2023. The redirector 2022 is able to perform policy based routing (PBR) to be explained later.

In step S4, the intercepting agent entity IAE 2023 receives the routed messages from the redirector 2022 and performs filtering of the traffic such that any messages having the default agent entity 2031 as a destination may be prevented from being relayed further, i.e. are intercepted.

In step S5, the intercepting agent entity IAE 2023 responds to the terminal 201 by sending a registration request response to the terminal 201 in case a registration request was routed to the intercepting agent entity IAE 2023 and intercepted in step S4. The registration request response is composed such that it comprises at least the terminal address as a destination, the default home agent entity 2031 as a source, the terminal identifier and the address of the optimum home agent entity 2024, which address is known or accessible (insofar predetermined) to the intercepting agent entity IAE 2023.

In step S6, like in step S7 in FIG. 1, the terminal 201 sends a registration request to the optimum home agent entity 2024, the registration request comprising the terminal identifier and the address of the indicated predetermined and thus the optimum home agent entity 2024, on which address the registration of the terminal 201 at the communication network 202, 2031, 2033 via the optimum home agent entity 2024 may be based.

In step S7, like in step S8 in FIG. 1, the terminal 201 may now access services 2034 in the system server 2033 via the gateway entity GW 2021 and home agent entity 2024.

In particular examples of the present invention, the network comprises a network element NWE 202 that has integrated access termination and a mobile IP home agent entity. In this example, a GGSN (Gateway GPRS Support Node) for GPRS access and the like via PDP context, and a Packet Data Gateway (PDG) for WLAN, WiMAX, xDSL, xPON, cable modem access and the like via IPsec tunnelling, are assumed to be present as access technologies without being restricted to these access technologies.

This network element NWE 202 also includes support for policy based routing (PBR) so that mobile IP packets destined to the default HA 2031 can be redirected to the so called "virtual default HA" referred to as intercepting agent entity IAE 2023. Subscribers having a terminal 201 (e.g. a terminal with both GPRS and WLAN capabilities) can, through this network element NWE 202, access the services 2034 in the system server 2033 e.g. either through GPRS or WLAN with seamless service continuity. The network element NWE 202 is also enabled to communicate with the default home agent entity 2031 and the system server 2033. These are used in case the "virtual default HA" is not used or is not available, like when the access termination is handled by a legacy GGSN.

Hence, this invention optimises the HA selection by introducing the virtual default HA.

After carrying out the method according to the present invention, the terminal 201 registers with an optimum agent entity 2024 as normally, and the subscriber can then access services 2034 in the system server 2033 via the gateway entity GW 2021 and the home agent entity 2024.

The terminal 201 can also establish the first connection to the Packet Data Gateway (PDG). In this case an IPsec tunnel for WLAN, WiMAX, xDSL, xPON, cable modem access and the like is established to the PDG as specified e.g. in 3GPP WLAN Interworking specifications. After that, policy based routing (PBR) is once again used to redirect the initial registration message to the intercepting agent entity IAE 2023 ("virtual default HA") and the message sequence is then identical with the one shown in FIG. 3 above.

Figure 4A:
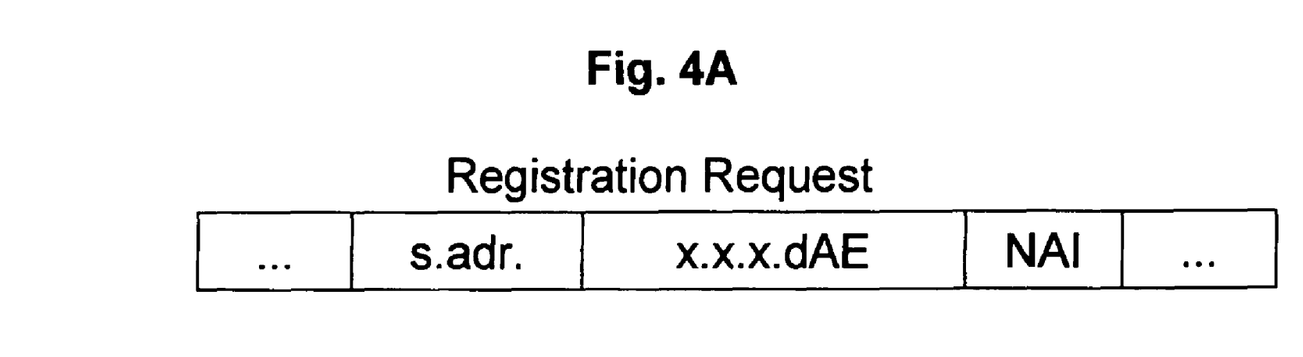
FIG. 4A shows a registration request according to the present invention, and FIG. 4B a registration request response according to the present invention.
Figure 4B:
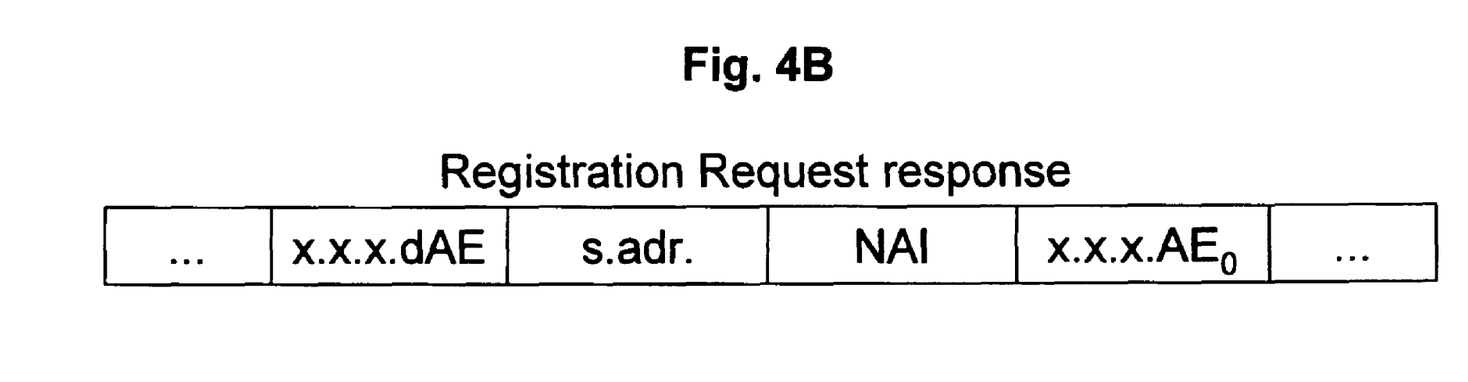

FIG. 4A shows a registration request according to the present invention, and FIG. 4B a registration request response according to present invention.

Within FIG. 4A, a registration request is shown. As described above, the registration request comprises at least the source address (s.adr.) e.g. of the terminal, the terminal identifier (referred to as "NAI" hereinafter) and the address of the default agent entity (referred to as "x.x.x.dAE" hereinafter). In a particular example of the present invention, the source address and the address of the default agent entity may also form a part of the IP packet header of the registration request, so the order of the information elements in the registration request is not significant nor do they have to be consecutive.

FIG. 4B shows a registration request response as described above. The registration request response comprises at least the source address (s.adr.) e.g. of the terminal, the address of the default agent entity (x.x.x.dAE), the terminal identifier (NAI) and the address of the optimum home agent entity (referred to as "x.x.x.$AE_0$" hereinafter). In a particular example of the present invention, the source address and the address of the default agent entity may also form a part of the IP packet header of the registration request response, so the order of the information elements in the registration request is not significant nor do they have to be consecutive.

It is to be understood that although Internet type addresses are used for the above addresses x.x.x.dAE, x.x.x.$AE_0$ for descriptive purposes, the present invention is not limited thereto. Any type of address may be used as long as the address is resolvable to an IP type address or an address type following the same or similar principles as IP.

Figure 5:
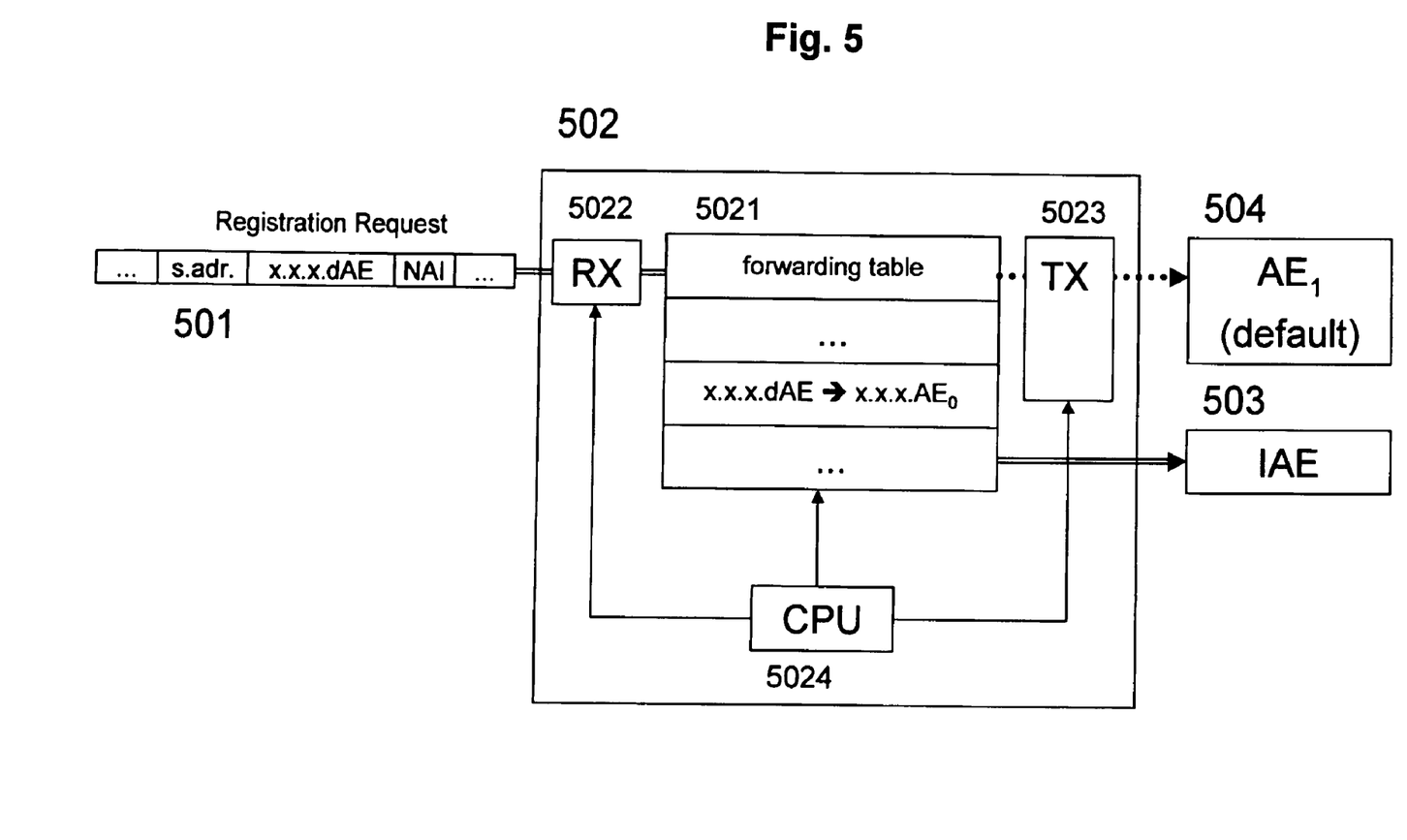
FIG. 5 shows schematically a redirecting module according to the present invention.

FIG. 5 shows schematically a redirecting module 502 according to the present invention.

Within FIG. 5, the redirecting module 502 is shown, which may be used as the redirector 2022 in the communication system 200 as shown in FIG. 2. The redirecting module 502 comprises a receiver RX 5022 configured to receive a registration request 501 comprising at least a source address, a terminal identifier NAI and a system-default destination address x.x.x.dAE, a memory 5021 configured e.g. as a look-up-table to hold at least one source-destination relation (x.x.x.dAE→x.x.x.$AE_0$) of the system-default destination address x.x.x.dAE of the system-default agent entity $AE_1$ 504 to an intercepting agent entity IAE 503 identified by its predetermined destination address x.x.x.$AE_0$, a processor 5024 configured to monitor the registration request 501 to detect the system-default destination address x.x.x.dAE, and a transmitter TX 5023 configured to send the registration request 501 to the intercepting agent entity IAE 503 in case the system-default destination address x.x.x.dAE is detected. In case the processor 5024 does not detect the system default destination address x.x.x.dAE, messages received by the receiver RX 5022 can simply be relayed further through the transmitter TX 5023.

The functionalities described above can be implemented by using e.g. Policy Based Routing (PBR).

The redirecting module 502 may be chipset insertable to the network element NWE 202.

Figure 6:
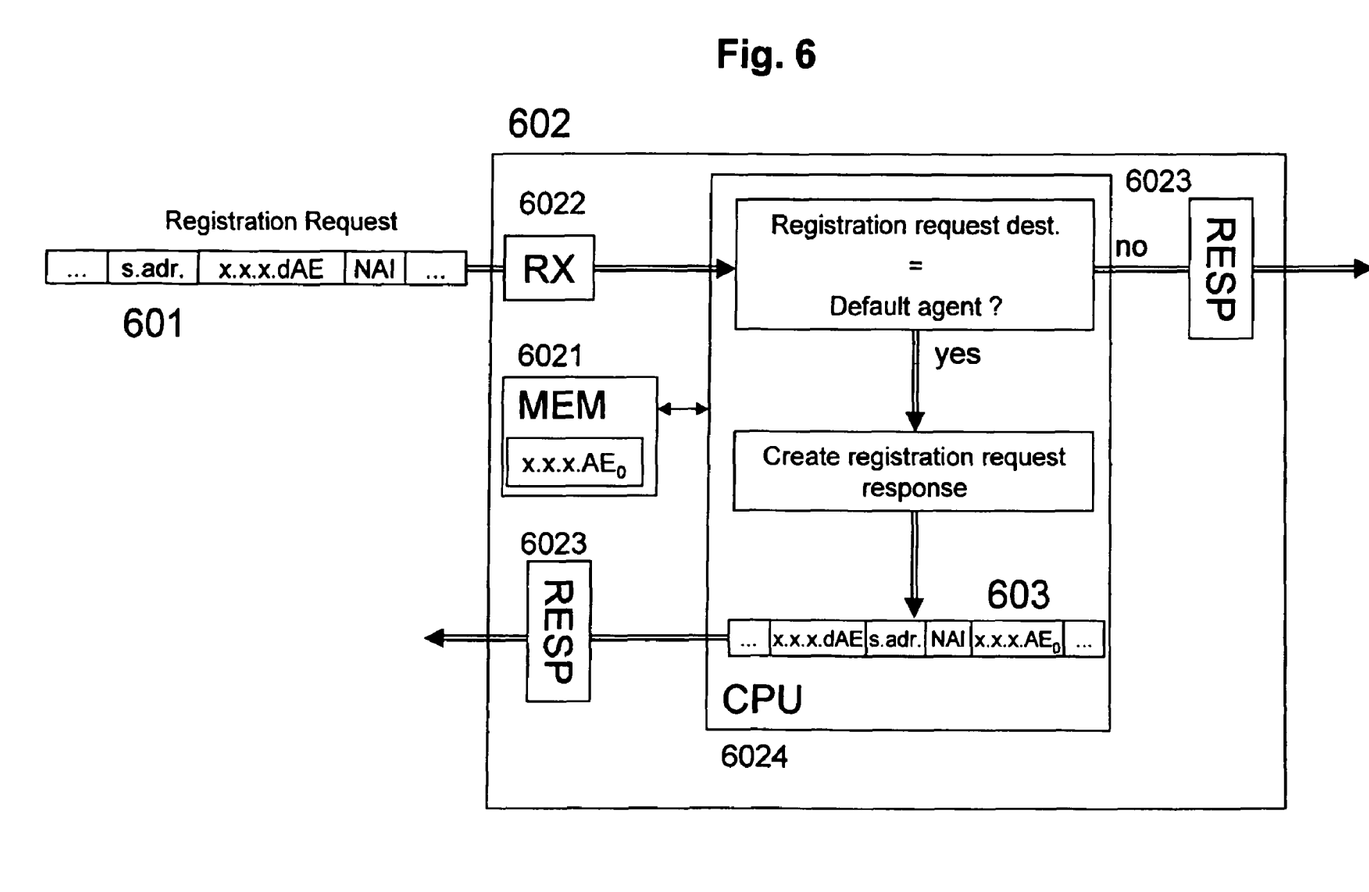
FIG. 6 shows schematically an intercepting module according to the present invention.

FIG. 6 shows schematically an intercepting module 602 according to the present invention.

Within FIG. 6, the intercepting module 602 is shown, which may be used as the intercepting agent entity IAE 2023 in the communication system 200 as shown in FIG. 2. The intercepting module comprises a receiver RX 6022 configured to receive a registration request 601 comprising at least a system-default destination address x.x.x.dAE, a terminal identifier NAI and a source address e.g. of the terminal, a memory 6021 configured to hold at least one desired predetermined registration address x.x.x.$AE_0$, a processor 6024 configured to monitor the registration request 601 so as to detect the system-default destination address x.x.x.dAE, to not relay the registration request 601 in case the system-default destination address x.x.x.dAE is detected, and to compose a registration request response 603 comprising at least the source address of the registration request 601 as a destination address, the system default destination address x.x.x.dAE, the terminal identifier NAI and the desired predetermined registration address x.x.x.$AE_0$, and a responder RESP 6023 configured to send the composed registration request response 603 to the source address of the registration request 601. In case the processor 6024 does not detect the system default destination address x.x.x.dAE, messages received by the receiver 6022 can simply be relayed further through the responder 6023.

The intercepting module 602 may be chipset insertable to the network element.

As derivable from the above, this invention is related, but not restricted, to the mobility in multi-access networks using Mobile IP.

According to the present invention, an intercepting agent entity is added to a communication system comprising a plurality of agent entities, of which one can be a default agent entity for the system. In terms of an optimized agent selection, it is preferred that the agent entity is located in or associated with the network element.

According to the present invention, in addition the default HA, an intercepting agent entity is used to optimize the selection of the agent entity to be assigned, preferably in a case where the access termination is located in the same node or network element, respectively, as the home agent entity.

The present invention may be briefly explained in that it uses a way to intercept the (e.g. MIP) messages destined to the default HA serving as an entry point for the terminal into the network. This interception is handled by the so-called "virtual default HA", i.e. the intercepting agent entity. Because the goal can be considered to select the integrated HA, i.e. the home agent entity, the virtual HA will redirect the session to the integrated HA located in the same node as the access termination and the virtual HA.

Since the intercepting agent entity adopts the function of the default HA, no modifications in the terminal are required.

In other words, because the virtual default HA acts on behalf of the real default HA, the client terminal "thinks" that it is discussing with the real default HA all the time. The virtual HA knows where the access was terminated because it is located in the same node where the access is terminated so it can send the redirection message to the terminal asking it to send the next registration request to the integrated HA. The node acting as a virtual default HA preferably includes policy based routing, so that the packets destined to the default HA are forwarded to the co-located virtual default HA instead of the real one.

The implementation of the mobility layer can be a Mobile IP Home Agent entity that acts as an entry point for user sessions. In case the access termination is implemented in a different network element than the mobile IP home agent entity there will be a need for extra signalling between the access termination node and the home agent entity.

Because the default agent entity is assumed to be totally independent from the node terminating the access in this case, the default HA has no means to know where the access was terminated, so that it could assign the HA integrated with the access termination. To get this information, some additional signalling is typically required via the AAA infrastructure.

Integrating the access termination and the home agent entity removes the need for extra signalling between the nodes, because the information from the access termination is already available to the home agent entity when it is located in the same node as the access termination.

For optimum performance of the network, selection of the most suitable mobile IP home agent entity is important. This invention proposes a solution on how to select a mobile IP home agent entity in a network with integrated access termination and mobile IP home agent entity for optimum performance.

To fully utilize the benefits of integrated access termination and mobile IP home agent entity, the mobile IP home agent entity should be selected from the same network element where the access is terminated. One way to select the integrated home agent entity is to use an external default home agent entity together with an external AAA server or system server, respectively, and Mobile IP redirection. However, this involves a great amount of signalling between different elements before the right home agent entity is selected.

Thus, the present invention has been described in detail above under a method aspect as well as a system aspect involving a network element aspect having an intercepting module aspect as well as a redirecting module aspect. It is well understood that a corresponding system comprising a network element having an intercepting module as well as a redirecting module in interaction with each other according to the present invention can be established and is covered by the idea underlying the present invention.

As has been described herein above, the present invention discloses a method for selecting an agent entity for a terminal in a communication system. The method comprises the steps of allocating an address to a terminal, the terminal configured to access a communication network using a selected access technology out of at least one access technology common to the terminal and the communication network, sending a registration request from the terminal to a default agent entity, redirecting, by a redirector, the registration request from the terminal to an intercepting agent entity based on identifying that the registration request is directed to the default agent entity, intercepting, by the intercepting agent entity, the redirected registration request from the terminal, responding, by the intercepting agent entity, a registration request response to the terminal, and registering, based on the response from the intercepting agent entity, the terminal at the predetermined agent entity of the plurality of agent entities of the communication network.

The invention claimed is:

1. A method comprising: allocating an address to a terminal, the terminal being configured to access a communication network via a gateway using a selected access technology out of at least two access technologies common to the terminal and the communication network; sending a registration request from the terminal, the registration request comprising an address of a default agent entity of the terminal as a destination address of the registration request; monitoring messages, by a redirector, to detect a message that comprises the address of the default agent entity and, in response to detecting the registration request received from the terminal that comprises the address of the default agent entity, redirecting, by the redirector, the registration request from the terminal to an intercepting agent entity; intercepting, by the intercepting agent entity, the redirected registration request from the terminal; responding, by the intercepting agent entity, with a registration request response to the terminal, where the registration request response comprises the address of the default agent entity of the terminal as a source address of the registration response and an address of a predetermined agent entity of a plurality of agent entities of the communication network; and registering, based on the response from the intercepting agent entity, the terminal at the predetermined agent entity of the plurality of agent entities of the communication network, wherein the terminal is configured to access based on one of an access via a packet data protocol context and an Internet protocol security (IPsec) access.

2. The method according to claim 1, wherein the sending comprises sending the registration request of the terminal comprising also a terminal identifier, and the address of the terminal.

3. The method according to claim 1, wherein the redirecting comprises policy based routing for routing the registration request comprising the default agent entity address to the intercepting agent entity.

4. The method according to claim 3, wherein the intercepting comprises receiving the routed registration request.

5. The method according to claim 2, wherein the responding comprises composing a registration request response comprising at least an address of the predetermined agent entity, the terminal identifier, the default agent entity address and the address of the terminal.

6. The method according to claim 5, wherein the registering is based on the address of the predetermined agent entity.

7. The method according to claim 1, wherein the allocating of the address comprises allocating in response to a connection-establishing request.

8. The method according to claim 1, wherein the packet data protocol context is for general packet radio service access.

9. The method according to claim 1, wherein the Internet protocol security access comprises use of an Internet protocol security tunnel for one of a wireless local area network, worldwide interoperability for microwave access, digital subscriber line, passive optical network, and cable modem access.

10. An apparatus, comprising: a gateway entity configured to execute at least one access technology, to send, to a terminal, an address allocated to the terminal, the terminal being configured to access a communication network via the gateway entity using a selected access technology out of at least two access technologies common to the terminal and the communication network, the terminal further configured to access based on one of an access via a packet data protocol context and an Internet protocol security (IPsec) access, said gateway entity further configured to relay a registration request from the terminal to a default agent entity to which the registration request is directed, where the registration request comprises an address of the default agent entity as a destination address of the registration request; a redirector configured to monitor messages to detect a message that comprises the address of the default agent entity, said redirector being further configured to respond to detecting the relayed registration request that comprises the address of the default agent entity to redirect the registration request from the terminal to an intercepting agent entity; an intercepting agent entity configured to intercept the redirected registration request from the terminal and to respond to the terminal with a registration request response, where the registration request response comprises the address of the default agent entity as a source address of the registration request response and an address of a predetermined agent entity of a plurality of agent entities of the communication network; and an agent entity configured to register the terminal as the predetermined agent entity based on the response from the intercepting agent entity.

11. The apparatus according to claim 10, wherein the registration request of the terminal comprises also a terminal identifier, and the address of the terminal.

12. The apparatus according to claim 10, wherein the redirector is configured to perform policy based routing to route the registration request comprising the default agent entity address to the intercepting agent entity.

13. The apparatus according to claim 12, wherein the intercepting agent entity is configured to receive the routed registration request.

14. The apparatus according to claim 11, wherein the intercepting agent entity is configured to respond by composing the registration request response comprising at least an address of the predetermined agent entity, the terminal identifier, the default agent entity address, and the address of the terminal.

15. The apparatus according to claim 14, wherein the agent entity is configured to register the terminal based on the address of the predetermined agent entity.

16. The apparatus according to claim 10, wherein the gateway entity is configured to relay the allocated address in response to a connection-establishing request.

17. The apparatus according to claim 10, wherein the packet data protocol context is for general packet radio service access.

18. The apparatus according to claim 10, wherein the Internet protocol security access comprises use of an Internet protocol security tunnel for one of a wireless local area network, worldwide interoperability for microwave access, digital subscriber line, passive optical network, and cable modem access.

19. A system, comprising: a terminal configured to access a communication network via a gateway entity using a selected access technology out of at least two access technologies common to the terminal and the communication network, wherein an address is allocated to the terminal and wherein the terminal is configured to access based on one of an access via a packet data protocol context and an Internet protocol security (IPsec) access; a plurality of agent entities; and a network element comprising a gateway entity configured to execute at least one access technology, to send, to the terminal, the address allocated to the terminal, and to relay a registration request from the terminal to a default agent entity, the registration request comprising an address of the default agent entity as a destination address of the registration request, a redirector configured to monitor messages to detect a message that comprises the address of the default agent entity, said redirector being further configured to respond to detecting the relayed registration request that comprises the address of the default agent entity to redirect the registration request from the terminal to an intercepting agent entity; an intercepting agent entity configured to intercept the redirected registration request from the terminal and to respond to the terminal with a registration request response, where the registration request response comprises the address of the default agent entity as a source address of the registration request response and an address of a predetermined agent entity of a plurality of agent entities of the communication network, and an agent entity configured to register the terminal as the predetermined agent entity based on the response from the intercepting agent entity.

20. An apparatus, comprising: executing means for executing at least one access technology; transmitting means for sending, to a terminal, an address allocated to the terminal, the terminal configured to access a communication network via a gateway using a selected access technology out of at least two access technologies common to the terminal and the communication network, and for relaying a registration request from the terminal to a default agent entity, the registration request comprising an address of the default agent entity as a destination address of the registration request; redirecting means for monitoring messages to detect a message that comprises the address of the default agent entity, said redirecting means further responding to detecting the relayed registration request that comprises the address of the default agent entity for redirecting the registration request from the terminal to an intercepting means based on identifying that the registration request comprises the address of the default agent entity; intercepting means for intercepting the redirected registration request from the terminal and for responding to the terminal with a registration request response, where the registration request response comprises the address of the default agent entity as a source address of the registration request response and an address of a predetermined registering means; and registering means for registering the terminal as the predetermined registering means based on the response from the intercepting agent entity, wherein the terminal is configured to access based on one of an access via a packet data protocol context and an Internet protocol security (IPsec) access.

21. A system, comprising: accessing means for accessing a communication network via an executing means for executing at least one access technology using a selected access technology out of at least two access technologies common to the means for accessing and the communication network, wherein an address is allocated to the means for accessing, said accessing means being configured to access based on one of an access via a packet data protocol context and an Internet protocol security (IPsec) access; a plurality of agent entities; and a network element comprising executing means for executing the at least one access technology, transmitting means for sending, to the accessing means, the address allocated to the accessing means, and for relaying a registration request from the accessing means to a default agent entity, the registration request comprising an address of the default agent entity as a destination address of the registration request, redirecting means for monitoring messages to detect a message that comprises the address of the default agent entity, said redirecting means further responding to detecting the relayed registration request that comprises the address of the default agent entity for redirecting the registration request from the accessing means to intercepting means, intercepting means for intercepting the redirected registration request from the accessing means and for responding to the accessing means with a registration request response, where the registration request response comprises the address of the default agent entity as a source address of the registration request response and an address of a predetermined registering means, and registering means for registering the accessing means as the predetermined registering means based on the response from the intercepting agent entity.

22. A computer program embodied on a non-transitory computer-readable medium, configured to control a method for selecting an agent entity for a terminal in a communication system, the method comprising: allocating an address to a terminal, the terminal being configured to access a communication network via a gateway using a selected access technology out of at least two access technologies common to the terminal and the communication network, wherein the terminal is further configured to access based on one of an access via a packet data protocol context and an Internet protocol security (IPsec) access, sending a registration request from the terminal to a default agent entity, the registration request comprising an address of the default agent entity as a destination address of the registration request, monitoring messages, by a redirector, to detect a message that comprises the address of the default agent entity and, in response to detecting the registration request received from the terminal that comprises the address of the default agent entity, redirecting, by the redirector, the registration request from the terminal to an intercepting agent entity; intercepting, by the intercepting agent entity, the redirected registration request from the terminal, responding, by the intercepting agent entity, with a registration request response to the terminal, where the registration request response comprises the address of the default agent entity as a source address of the registration request response and an address of a predetermined agent entity of a plurality of agent entities of the communication network and registering, based on the response from the intercepting agent entity, the terminal at the predetermined agent entity of the plurality of agent entities of the communication network.

23. The computer program according to claim 22, wherein the computer program is directly loadable into an internal memory of the network element.

24. A method, comprising: receiving at a wireless network element a registration request message from a terminal having an allocated address, the registration request message comprising a default agent entity address as a destination address of the registration request message; monitoring received messages to detect a message that is addressed to the default agent entity and, in response to detecting the registration request message received from the terminal that is addressed to the default agent entity, redirecting the registration request message received from the terminal to an intercepting agent entity such that the registration request message is prevented from being relayed to the default agent entity; receiving the redirected registration request message at the intercepting agent entity and responding to the terminal with a registration request response having the default agent entity address as a source address of the registration request response; and registering the terminal based on the response from the intercepting agent entity; where the wireless network element is configured to be accessed by the terminal via a gateway of a communication network using an access technology selected from at least two access technologies common to the communication network and the terminal, where the access is based on one of an access via a packet data protocol context and an Internet protocol security (IPsec) access.

25. The method according to claim 24, wherein the registration request message of the terminal further comprises a terminal identifier and the address of the terminal.

26. The method according to claim 24, where redirecting the registration request message further comprises performing policy-based routing.

27. The method according to claim 24, where the registration request response comprises at least an address of the predetermined agent entity, the terminal identifier, the default agent entity address, and the address of the terminal.

28. An apparatus, comprising: at least one processor; and at least one memory including computer program code, the at least one memory and the computer program code configured to, with the at least one processor, cause the apparatus at least to perform receive an access from a terminal via a gateway of a communication network, where the terminal has an allocated address and where the access is made using an access technology selected from at least two access technologies common to the communication network and the terminal, and where the access is based on one of an access via a packet data protocol context and an Internet protocol security (IPsec) access; monitor received messages to detect a registration request message from the terminal, the registration request message comprising as a destination address an address of a default agent entity, in response to detecting the registration request message from the terminal that is addressed to the default agent entity, to redirect the registration request message received from the terminal to an intercepting agent entity, receive the redirected registration request message at the intercepting agent entity and respond to the terminal with a registration request response that comprises an address of an entity to register the terminal, where the registration request message comprises the default agent entity address as the destination address of the registration request, a terminal identifier, and the address of the terminal, and where the registration request response further comprises the terminal identifier, the default agent entity address as a source address of the registration request response, and the address of the terminal as a destination address.

29. The apparatus according to claim 28, embodied at least partially as a chipset.

* * * * *